United States Patent
Cho

(10) Patent No.: US 7,231,236 B2
(45) Date of Patent: Jun. 12, 2007

(54) INTEGRATED ANTENNA AND INPUT/OUTPUT PORT FOR A WIRELESS COMMUNICATION DEVICE

(75) Inventor: Se-hoon Cho, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 228 days.

(21) Appl. No.: 10/899,269

(22) Filed: Jul. 26, 2004

(65) Prior Publication Data
US 2005/0037824 A1    Feb. 17, 2005

(30) Foreign Application Priority Data
Aug. 1, 2003    (KR)    ............... 10-2003-0053394

(51) Int. Cl.
*H04M 1/00*    (2006.01)
*H01Q 1/24*    (2006.01)
*H01Q 1/00*    (2006.01)

(52) U.S. Cl. .............. 455/575.7; 343/702; 343/720; 343/906; 439/916

(58) Field of Classification Search ............ 455/575.7; 343/720, 906, 702; 439/916
See application file for complete search history.

(56) References Cited

U.S. PATENT DOCUMENTS

| | | | | |
|---|---|---|---|---|
| 2,492,404 | A | * | 12/1949 | Streib et al. ............ 29/600 |
| 5,778,306 | A | * | 7/1998 | Kommrusch ............ 455/78 |
| 6,205,344 | B1 | * | 3/2001 | Demuro et al. .......... 455/575.7 |
| 6,252,544 | B1 | * | 6/2001 | Hoffberg ............ 342/357.1 |
| 6,419,506 | B2 | * | 7/2002 | Jones et al. ............ 439/131 |
| 6,975,274 | B2 | * | 12/2005 | Sanchez et al. .......... 343/702 |

* cited by examiner

Primary Examiner—Lester G. Kincaid
Assistant Examiner—Matthew C Sams
(74) Attorney, Agent, or Firm—Drinker Biddle & Reath LLP

(57) ABSTRACT

A wireless communication device is disclosed. The wireless communication device comprises a body; and an input/output port installed on a side of said body and electrically connected to an antenna connecting portion of a communication module installed in said body. Thus, the input/output port of the wireless communication device also functions as the antenna.

17 Claims, 2 Drawing Sheets ically, a side of the input/output port 32 is electrically
INTEGRATED ANTENNA AND INPUT/OUTPUT PORT FOR A WIRELESS COMMUNICATION DEVICE

BACKGROUND OF THE INVENTION

This application claims the priority of Korean Patent Application No. 2003-53394, filed on Aug. 1, 2003, in the Korean Intellectual Property Office, the disclosure of which is incorporated herein in its entirety by reference.

1. Field of the Invention

The present invention relates to a wireless communication device in which an input/output port for connecting to an external electronic device, such as computer, is integrated with an antenna.

2. Description of the Related Art

Conventionally, a wireless communication device, such as a cellular phone or PDA, includes an input/output port for coupling to a personal computer and includes an antenna. The antenna of the wireless communication device provides distance and quality for the wireless communication. The input/output port may enable the control of an internal program installed in the wireless communication device by using the personal computer and may enable the exchange of data between the wireless device and the personal computer. The input/output port included in the cellular phone or the PDA is connected to the personal computer via a cable, which is provided by a manufacturer of the cellular phone or the PDA.

The personal computer includes various kinds of the input/output ports for communication with peripheral devices. For example, it includes a parallel port, a serial port, a universal serial bus port (i.e., USB port) and an IEEE 1394 port. Among those input/output ports, only the USB port includes a terminal for supplying power as well as a terminal for communication. Thus, the USB port makes it possible to drive a small-sized data storing memory device while performing data communication at the same time.

FIG. 1 is an explanatory view of the above-described personal computer, the cellular phone, and the small-sized data storing memory device.

Referring to FIG. 1, the personal computer comprises a main body 11, a monitor 12, a keyboard 13, and a mouse 14. The monitor 14, the keyboard 13, and the mouse are each connected to the main body 11 using cables.

The cellular phone 15 includes an antenna 16 on the upper side of the body and an input/output port 17 on the lower side of the body. The antenna 16 of the cellular phone 15 is provided in such a manner that it may be inserted into or pulled out of the body of the phone. A connector 18*a* of a cable 18 can be connected to the input/output port 17 of the cellular phone 15. The other connector 18*b* of the cable 18 may be connected to the input/out port (not shown) included in the main body 11 of the personal computer.

A small-sized data storing memory device 20 is connected to the USB port (not shown) installed at the main body 11 of the personal computer via a USB cable 19. The USB cable 19 includes a socket 19*a* at one end thereof and a connector 19*b* at the other end thereof. Accordingly, the connector 21 of the small-sized data storing memory device 20 is inserted into the socket 19*a*, while the connector 19*b* of the cable 19 is connected to the USB port (not shown) of the body 11.

The wireless communication device, such as the cellular phone as shown in FIG. 1 includes the following problems. Because the wireless communication device needs to use the cable 18 provided by the manufacturing company of the device when coupling to the personal computer, the cable became an indispensable item if a user intends to control the wireless communication device by using the personal computer. However, as the cables for wireless communication devices may differ from each other according to manufacturer and model type, compatibility with various cables cannot be assured. Moreover, the input/output port 17 is generally located on a side of a wireless communication device (such as the cellular phone 15), and this location may adversely affect the external design of the wireless communication device. Furthermore, the input/output port 17 may require a separate cap for protection, and may impose a restriction upon design.

SUMMARY OF THE INVENTION

The present invention provides a wireless communication device having an input/output port integrated with an antenna. The present invention also provides a wireless communication device having a data storing memory installed therewith. According to an aspect of the present invention, a wireless communication device comprises a housing and an input/output port on a side of said housing, wherein the input/output portion also serves as an antenna for the wireless communication device. The input/output port is electrically connected to an antenna connecting portion for a communication module installed in the housing of the wireless communication device.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 2:
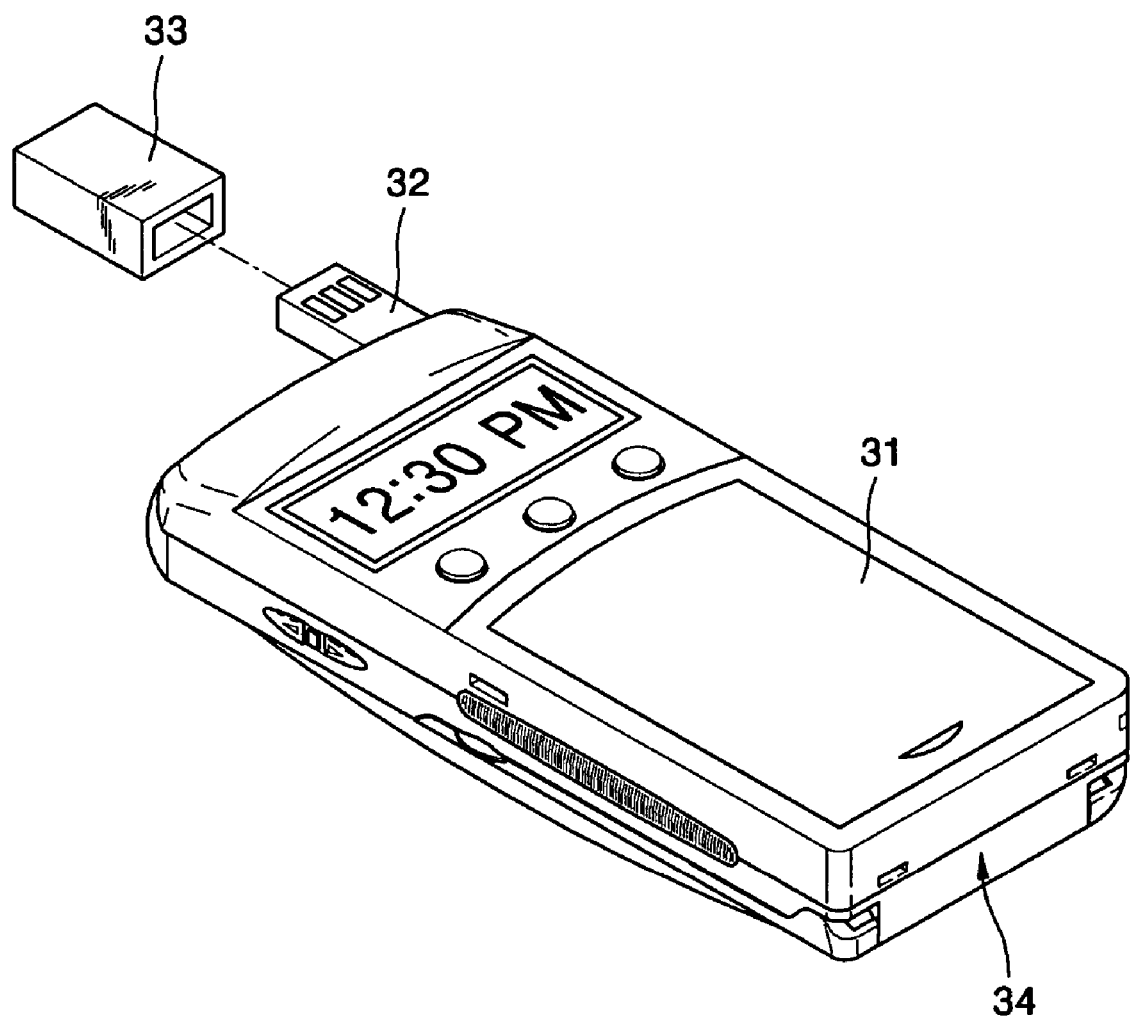
FIG. 2 is a schematic perspective view of a wireless communication device according to the present invention.

Hereinafter, an embodiment of the present invention will be more specifically described with reference to FIG. 2. FIG. 2 is a perspective view showing an embodiment of the wireless communication device according to the present invention.

Referring to FIG. 2, the wireless communication device of the present invention comprises a body 31 having an input/output port 32 for data communication integrated with an antenna. The wireless communication device as shown in the drawing is a cellular phone and the input/output port 32 is a USB port that projects out of the body 31 of the wireless communication device. In an alternative embodiment, the input/output port 32 may be an IEEE 1394 port.

Typically, an outer housing of the USB port is made of metallic material, thus the outer housing of the USB port has excellent electrical conductivity. Accordingly, the USB port itself can perform a function of the antenna. More specifically, a side of the input/output port 32 is electrically connected to the antenna connecting portion of a communication module (not shown) included in the body 31 of the wireless communication device, so that the input/output port 32 can perform the function of the antenna for the wireless communication device. Virtually any type of USB port may be used for embodying the present invention.

The input/output port 32 that is a USB port can be conveniently connected to the personal computer using a conventional USB cable. (It is possible to directly connect the input/output port 32 to the USB port of the personal computer even without the USB cable.) In a state in which the wireless communication device is connected to the personal computer via the input/output port 32, the user can control the wireless communication device using the personal computer.

Figure 1:
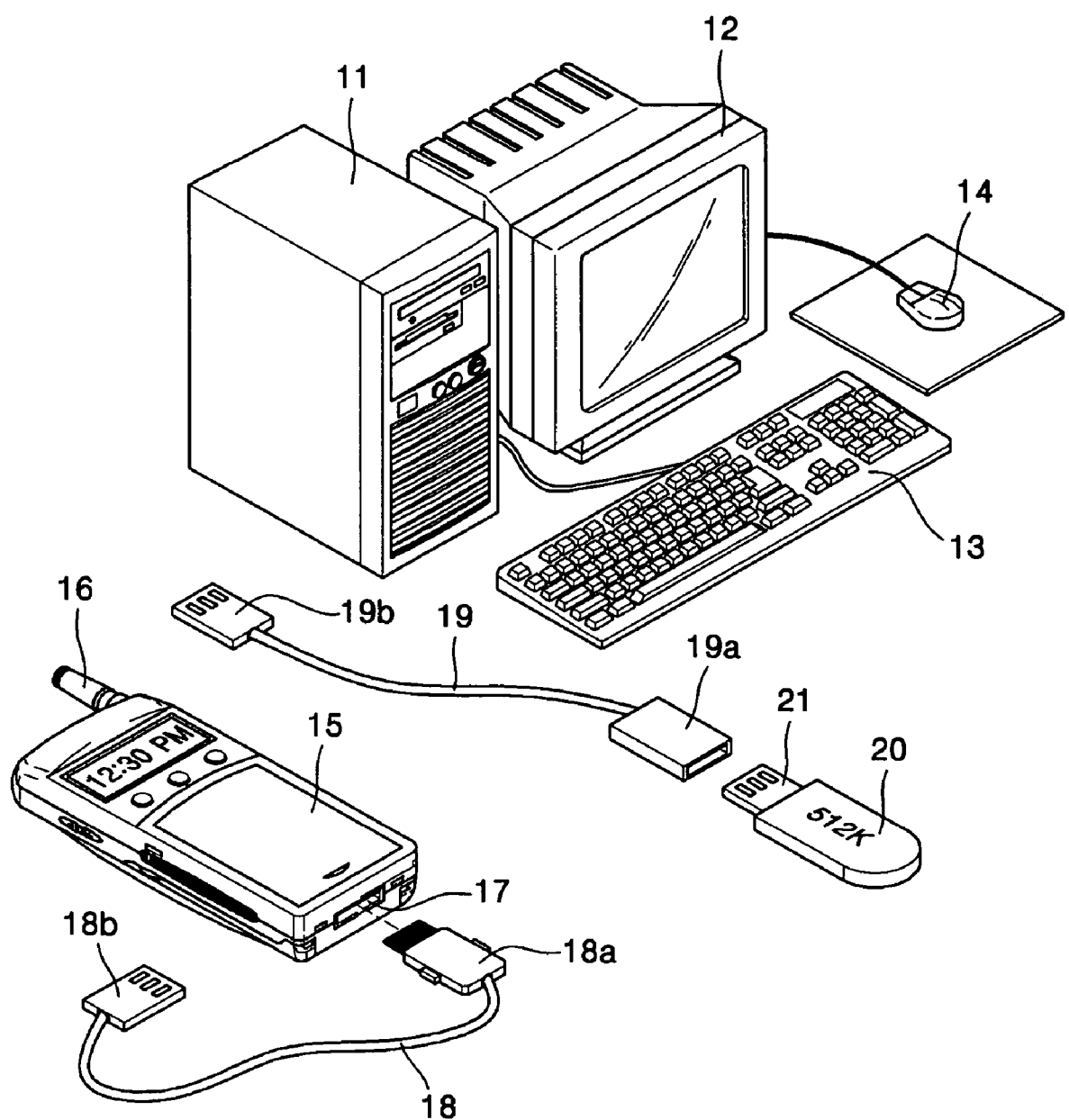
FIG. 1 is an explanatory view of a conventional wireless communication device, a personal computer and a data storing memory device.

As the input/output port 32 now serves as the antenna on the outer side of the body 31 of the wireless communication device, the conventional antenna 16 located on the upper side of the body and the conventional input/output port 17 located on the lower side of the body (FIG. 1) may be removed. A cap 33 is provided for covering the input/output port 32 located on the upper side of the body 31 of the wireless communication device.

According to another characteristic of the present invention, a data storing memory device may be included in the body 31 of the wireless communication device. The data storing memory device can communicate with the personal computer (not shown) via the input/output port 32. Accordingly, the user can save any types of necessary data in the data storing memory device included in the body 31 without an external data storing memory device. The data storing memory device in the body 31 may include a memory assignment for the wireless communication and another memory assignment for the data storage. Those two memory assignments may be available independently from each other.

The input/output port 32 may be formed to be inserted into/pulled out of the body 31. In such a case, a guide slot (not shown) may be provided on an upper part of the body 31 and the input/output port 32 may slide along the guide slot.

When the wireless communication device is connected to the personal computer via the input/output port 32, the personal computer can recognize the data storing memory device included in the wireless communication device as a universal data storing memory device via the USB port. Accordingly, the user can perform data transmission and reception to and from the personal computer using a universal computer file management program without any other exclusive program. On the other hand, when setting up the operating configuration of the wireless communication device itself, the user can perform the data transmission and reception to and from the personal computer using the exclusive program for data communication. Furthermore, the user can make use of a new program provided by the manufacturer of the wireless communication device. The new program can be downloaded to the wireless communication device through the internet communication of the personal computer and the connection of the input/output port 32 of the wireless communication device to the USB port of the personal computer without a separate program.

The above-described wireless communication device and the input/output port thereof have been explained by exemplifying the cellular phone and the USB port included therein. In other embodiments not shown in the drawing, however, the wireless communication device may be the personal digital assistance (PDA) or the input/output port 32 may be an IEEE 1394 port. Virtually any type of port that contains electrically conductive material may be used to embody the invention.

The wireless communication device according to the present invention includes either the USB port or the IEEE 1394 port as the input/output port for connecting to the personal computer, so that it can communicate with the personal computer more easily. Also, the input/output port of the wireless communication device has the function of the antenna, so that the overall design of the wireless communication may be simplified. Furthermore, the data storing memory device included in the wireless communication device can save not only the data for the wireless communication, but also any data the user wishes to save. In addition, such data can be inputted and outputted more conveniently using the input/output port. The wireless communication device and the data storing memory device included therein share components necessary for operation of respective devices, so that the two different devices can be integrated into one.

Also, the wireless communication device according to the present invention further includes the extension extending through the input/output port, such as the USB port or IEEE 1394 port, so that it facilitates the communication to the outer devices, such as the personal computer, another communication devices, multimedia reproduction media or the memory device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A wireless communication device comprising:
    a housing; and
    an input/output connector outwardly extending from a side of the housing for electrical interfacing with an external device, the connector comprising
        a metallic outer shell which constitutes an antenna for wireless communication, and
        a plurality of electrical contacts disposed within the metallic outer shell;
    wherein the housing, the connector and the antenna are physically integral.

2. The device of claim 1, wherein the input/output connector is electrically connected to an antenna connecting portion for a communication module installed in the housing of the wireless communication device.

3. The device of claim 1, wherein the input/output connector is a USB connector.

4. The device of claim 1, wherein the input/output connector is an IEEE 1394 connector.

5. The device of claim 1, further comprising:
    a cap for covering the input/output connector.

6. The device of claim 1, wherein the device is a cellular phone.

7. The device of claim 1, wherein the device is a personal digital assistant.

8. The device of claim 1, further comprising:
    a data storing memory device.

9. The device of claim 8, wherein data communication with a peripheral device is attained via the input/output connector.

10. The device of claim 1, wherein the input/output connector connects to a peripheral device via a cable.

11. A wireless communication device comprising:
    a input/output connector configured to electrically couple with a complementary input/output port of an external host device, the input/output connector outwardly extending from a side of a housing of the wireless communication device, the input/output connector comprising:

a metallic outer shell which constitutes an antenna for wireless communication, and a plurality of electrical contacts disposed within the metallic outer shell;

wherein the input/output connector, the housing and the antenna are physically integral.

12. The device of claim 11, wherein the input/output connector transmits and receives data to and from the external host device when physically coupled to the external host device.

13. The device of claim 11, wherein the input/output connector comprises an external data bus port.

14. The device of claim 11, further comprising a protective cover that fits over the input/output connector.

15. A wireless communication device comprising: a body; and an external data bus including an electrically conductive outer shell which constitutes an antenna for wireless communication and a plurality of electrical contacts disposed within the conductive outer shell, the outer shell being attached to and extending outwardly from a side of the body, the outer shell being sized to fit into an external data bus port of a computer, wherein the external data bus transmits data to and from the computer when physically coupled to the external data bus port, and wherein the body, the external data bus and the outer shell are physically integral.

16. The device of claim 15, wherein the external data bus comprises a USB connector.

17. The device of claim 15, wherein the external data bus comprises an IEEE 1394 connector.

* * * * *